Feb. 28, 1928.

A. E. EVANS 1,660,327

CUTTING TABLE

Filed June 9, 1926

4 Sheets-Sheet 1

INVENTOR
A. E. Evans

Feb. 28, 1928.

A. E. EVANS 1,660,327

CUTTING TABLE

Filed June 9, 1926

4 Sheets-Sheet 3

INVENTOR
A. E. Evans

Feb. 28, 1928.

A. E. EVANS 1,660,327

CUTTING TABLE

Filed June 9, 1926    4 Sheets-Sheet 4

INVENTOR
Albert E. Evans
by
James E. Bradley
atty

Patented Feb. 28, 1928.

1,660,327

UNITED STATES PATENT OFFICE.

ALBERT E. EVANS, OF PITTSBURGH, PENNSYLVANIA, ASSIGNOR TO PITTSBURGH PLATE GLASS COMPANY, A CORPORATION OF PENNSYLVANIA.

CUTTING TABLE.

Application filed June 9, 1926. Serial No. 114,737.

Figure 1:
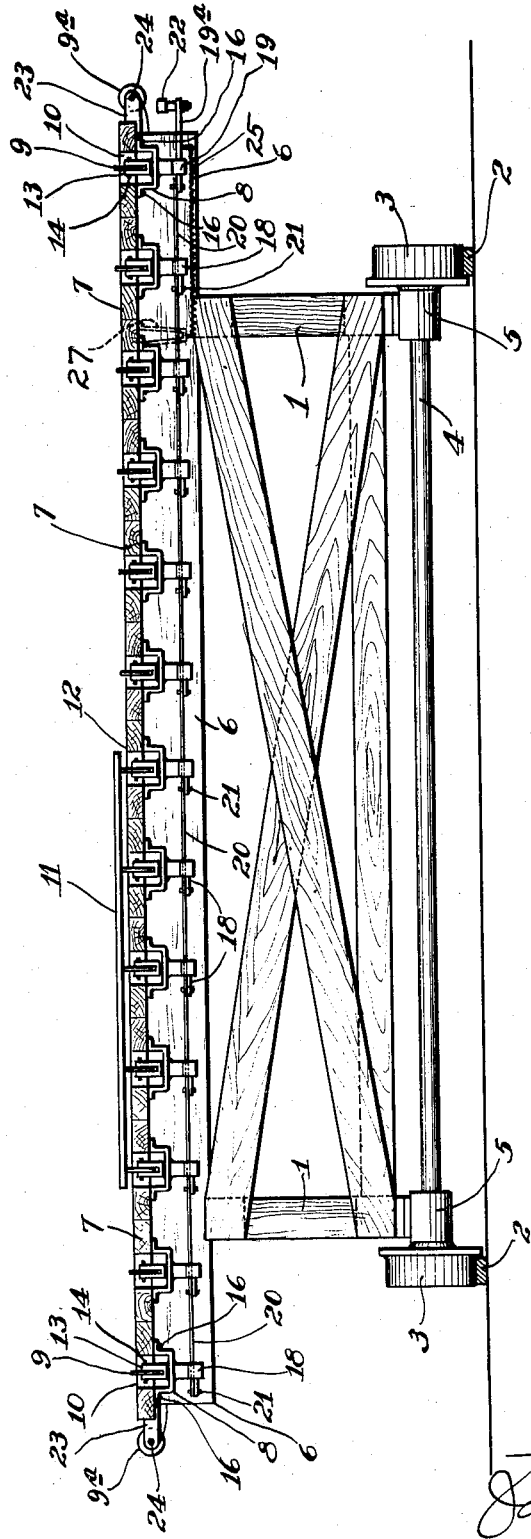
Figure 2:
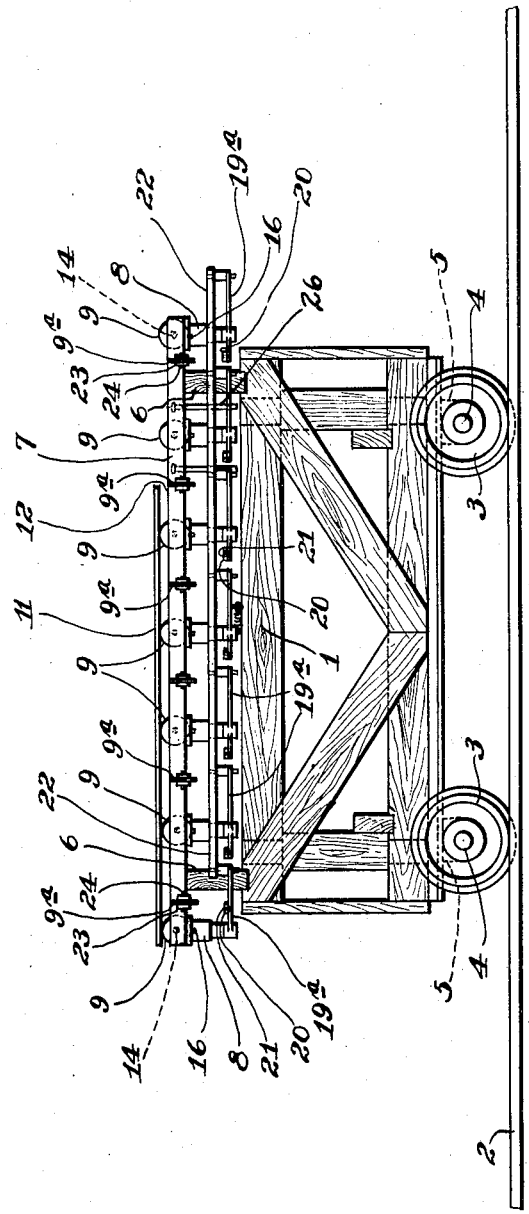
Figure 3:
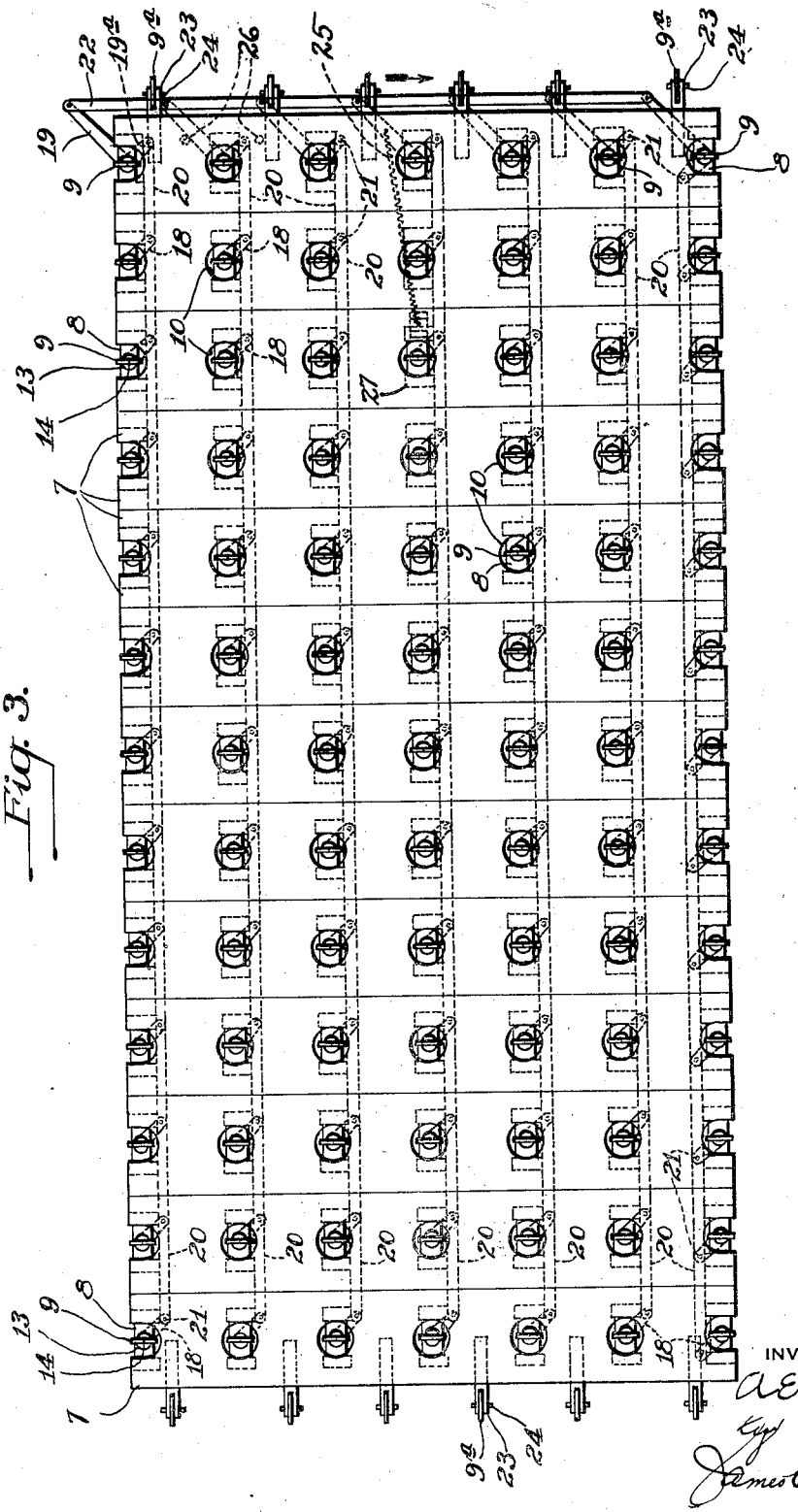
Figure 4:
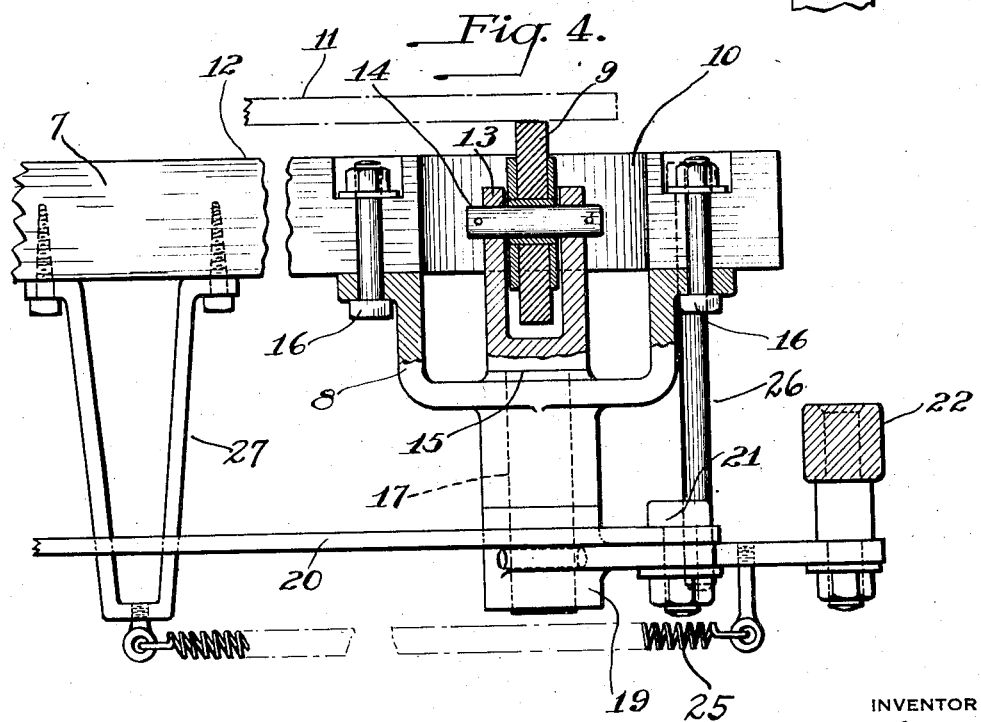

The invention relates to apparatus for cutting tables, for handling, while trimming or cutting to size, sheets of glass or sections of a continuously formed sheet or ribbon of glass at the outlet end of the leer through which the sheets or ribbon is carried. It has for its principal objects the provision of an arrangement whereby the sheets may be laid on or rolled from a cracking off table, as described in the patent of Albert E. Evans, No. 1,569,079, issued January 12, 1926, onto the cutting table adjacent thereto. The sheet is trimmed or cut to size, then rolled from the table to an adjacent conveyor, and carried to a position adjacent the tracks upon which are mounted the grinding and polishing tables, or it may be rolled transversely on the table and lifted off at the sides by the cutters or by a special hoist. The transverse rolling of the sheet is achieved by the novel arrangement and mounting of the carrying rollers on the table, the said roller supports being pivoted and mounted to the table in such a way that the vertical axes of rotation of the said rollers may be turned 90 degrees while carrying the sheet of glass, and held in this position while the sheet of glass is rolled transversely to the side of the table, lifted off and carried away by any convenient means. One embodiment of the invention is illustrated in the accompanying drawings, wherein:

Figure 1 is a front view of the cutting table looking from the cracking-off table. Fig. 2 is a side view. Fig. 3 is a plan view. Fig. 4 is an enlarged detail section through one of the roller mountings taken on the line IV—IV of Fig. 5. And Fig. 5 is an enlarged plan view of Fig. 4.

Referring to Fig. 1, 1 is the cutting table frame built up of lumber or light structural members and is carried on the tracks 2, 2 for longitudinal movement by the wheels 3, 3 on the shafts 4, 4, mounted for rotation in the roller bearings 5, 5 bolted to the bottom of the table frame 1. The roller bearings 5, 5 reduce to a minimum the power required to push the table longitudinally between the cracking off table and a conveyor adjacent thereto. The table frame 1 carries the transverse beams 6, 6, 6, 6, to which is bolted the top covering 7. Bolted to the underside of the top covering 7 are the roller brackets 8. By referring to Fig. 3, the general location and spacing of these brackets will be seen, this spacing being such that the sheets of glass will not break as they are rolled about on the rubber covered rollers 9, which protrude up through the holes 10 in the covering 7, so that the point of contact with the underside of the sheet of glass 11 is about one-half inch above the top 12 of the table. This allows the sheet of glass 11 to roll about on the rubber covered rollers 9, without touching the table covering 7.

Figure 5:
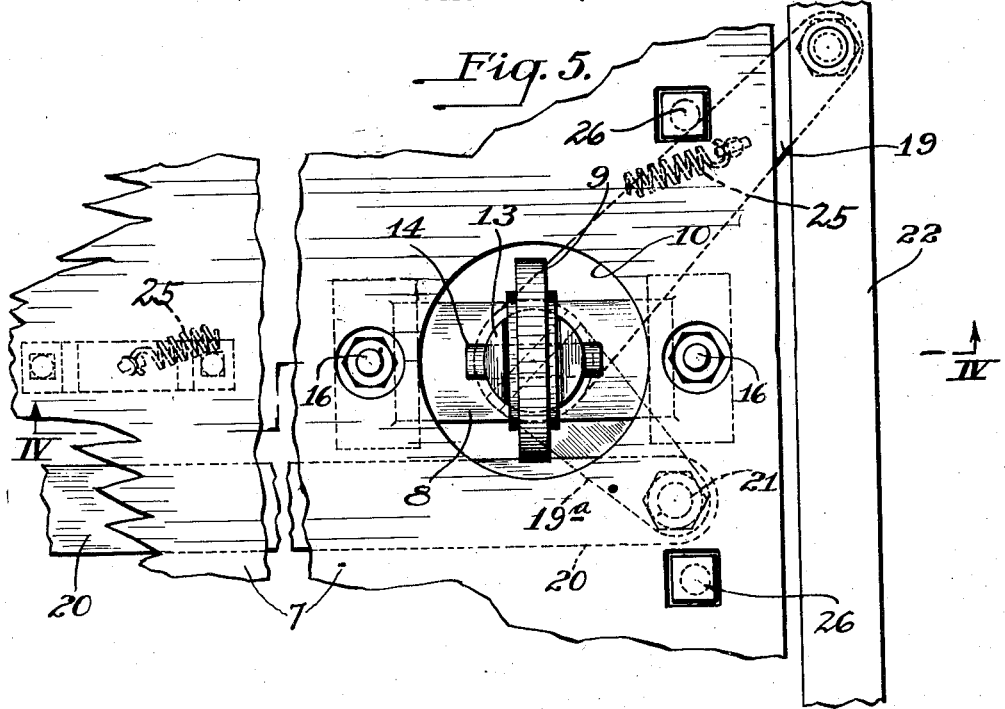

By referring to Figs. 4 and 5, 8 is the roller bracket bolted to the underside of the table covering 7, 9 the rubber covered roller, 10 the hole in the covering 7, 11 the sheet of glass carried by the rollers 9, and 12 is the top of the cutting table above which the rollers 9 protrude about one-half inch to allow for free rolling of the sheets of glass. Carrying the roller 9 is the pivoted roller support 13, mounted in vertical position in the bracket 8. The upper end of the support 13 is forked and carries the roller 9 which revolves on the pin 14. Just below the forked end, is a shoulder 15 which supports the weight imposed by the glass upon the roller 9, the bracket 8 being secured by means of the bolts 16, 16. The lower part or stem 17 of the support 13 is carried in the bracket 8 and projects far enough through the bracket 8 to allow the levers 18 or the bell crank 19 (having a short arm 19ª) to be pinned thereto. The rotating of the supports 13 is accomplished by a series of links 20, connected to the levers 18 and the short arm 19ª of the bell cranks 19 by the bolts 21. To the end of the long arms of the series of bell cranks 19 is secured the handle 22 by which, in conjunction with the parts 18, 19 and 20, all the rollers 9 can be rotated together 90 degrees.

Referring to Fig. 3, when the handle 22 is pulled in the direction of the arrow, the bell cranks 19, which are pinned to the end of the pivoted roller support 13, are rotated 90 degrees, and all of the rubber covered rollers 9 are caused to rotate the same amount by means of the short arm 19ª on the bell crank, the levers 18, and the parallel links 20.

The ends of the table are provided with a series of rubber covered rollers 9ª (Figs. 1 and 3) carried in the brackets 23 on the pins 24, and provide a rolling edge over which the sheet may be pulled when it is desired to roll the sheet of glass transversely. In order that the rollers may be definitely positioned in either one of their two extremes of movement and held against accidental displacement from such positions, the spring 25 and the stops 26 are preferably employed. The stops 26 (Figs. 3, 4 and 5) project downwardly from the table top and engage one of the arms 19 when it is in its two extremes of movement. The spring 25 is anchored at one end to a bracket 27, projecting downwardly from the table top (Fig. 4) and is connected at its other end to one of the arms 19. The spring is under tension and tends to hold the parts in the position shown in Fig. 1. It performs the same function when the arm 19, to which it is attached, is swung through an arc of 90 degrees, as this carries the spring to the other side of the vertical axis of rotation of such arm. This feature of construction adds to the ease of operation of the apparatus and also to its safety.

In operation, the glass is moved onto the table from the cracking-off table, with the rollers 9 in the position shown in Figs. 1, 2 and 3. After the glass thus positioned is on the table, it is trimmed or cut to size in the usual way, after which the table is pushed longitudinally on the tracks 2, 2 to a position adjacent a conveyor where the sheet of glass is pushed off the table onto the conveyor without changing the position of the rollers. However, if the sheet of glass is not to be carried over to the conveyor, the handle 22 is pulled in the direction of the arrow (Fig. 3), which rotates the rollers 9 90 degrees, thus changing the axis of rotation of the said rollers so that the sheet of glass may be rolled longitudinally of the table, where it is lifted off by the cutters or by some other convenient means. This lifting off is facilitated by the rollers 9ª about which the sheet is fulcrumed, as it is tilted by the operator from a horizontal position to an upright position in order that he may lift it more easily. The construction thus provides for the shifting of the glass sheets on the table in both directions, and its removal therefrom, with a minimum amount of effort, thus speeding up the cutting and trimming.

What I claim is:

1. In combination with a cutting table, a plurality of rollers with horizontal axes of rotation distributed over the area of the table and projecting above the surface thereof, means for supporting the rollers for rotation about vertical axes, and connecting means between said last means for shifting the rollers in unison about said vertical axes.

2. In combination with a cutting table, a plurality of rollers with horizontal axes of rotation distributed over the area of the table and projecting above the surface thereof, vertical axles or spindles carrying said rollers and adapted to be turned through an angle of ninety degrees, means for turning said axles, and connecting means between said means for turning the axles in unison.

3. In combination with a cutting table, a plurality of rollers with horizontal axes of rotation distributed over the area of the table and projecting above the surface thereof, vertical axles or spindles carrying said rollers and adapted to be turned through an angle of ninety degrees, means for turning said axles, connecting means between said means for turning the axles in unison, and yielding means for maintaining the vertical axles or spindles in both extremes of movement.

4. In combination with a cutting table, a plurality of rollers with horizontal axes of rotation distributed over the area of the table and projecting above the surface thereof, vertical axles or spindles carrying said rollers and adapted to be turned through an angle of ninety degrees, means for turning said axles, stop means for limiting the rotative movement of the vertical axles or spindles, and yielding means for moving said axles or spindles to such extremes of rotative movement and maintaining them in such positions.

5. In combination with a cutting table, a plurality of rollers with horizontal axes of rotation distributed over the area of the table and projecting above the surface thereof, means for supporting the rollers so that they may be turned about vertical axes, and a series of rollers along the extreme end of the table mounted on fixed horizontal axes and serving as a support for the glass sheet on the table as such sheet is tilted in removing it from the table.

6. In combination with a cutting table, a plurality of rollers with horizontal axes of rotation distributed over the area of the table and projecting above the surface thereof, means for supporting the rollers so that they may be turned about vertical axes, and a series of rollers along the extreme end of the table mounted on fixed horizontal axes and serving as a support for the glass sheet on the table as such sheet is tilted in removing it from the table, such rollers having the upper portions of their peripheries located below the level of the upper portions of the peripheries of the first mentioned rollers.

In testimony whereof, I have hereunto subscribed my name this 27th day of April, 1926.

ALBERT E. EVANS.